US008000837B2

(12) United States Patent
Allen et al.

(10) Patent No.: US 8,000,837 B2
(45) Date of Patent: Aug. 16, 2011

(54) PROGRAMMABLE LOAD FORMING SYSTEM, COMPONENTS THEREOF, AND METHODS OF USE

(75) Inventors: Robert M. Allen, Greenacres, WA (US); Kevin P. Brown, Nine Mile Falls, WA (US); Andrew B. Holt, Coeur d'Alene, ID (US); Lynn E. Vershum, Coeur d'Alene, ID (US)

(73) Assignee: J&L Group International, LLC, Keithville, LA (US)

( * ) Notice: Subject to any disclaimer, the term of this patent is extended or adjusted under 35 U.S.C. 154(b) by 1569 days.

(21) Appl. No.: 11/239,665

(22) Filed: Sep. 28, 2005

(65) Prior Publication Data
US 2006/0106487 A1   May 18, 2006

Related U.S. Application Data

(60) Provisional application No. 60/616,578, filed on Oct. 5, 2004.

(51) Int. Cl.
*G06F 19/00* (2011.01)

(52) U.S. Cl. ........ 700/245; 700/213; 700/247; 700/257; 414/788.9; 414/791.6; 414/792.9; 83/86; 83/87; 83/94; 209/534; 219/74

(58) Field of Classification Search ................. 700/245, 700/213, 247, 257; 414/788.9, 788.12, 791.6, 414/792.9; 83/86, 87, 94; 209/534; 219/74
See application file for complete search history.

(56) References Cited

U.S. PATENT DOCUMENTS

| | | | |
|---|---|---|---|
| 3,730,357 A | 5/1973 | Beaty, Jr. et al. | |
| 3,819,062 A | 6/1974 | Di Frank et al. | |
| 3,986,621 A | 10/1976 | Bowser | |
| 3,994,407 A | 11/1976 | Von Gal, Jr. et al. | |
| 4,000,820 A | 1/1977 | Kurk et al. | |
| 4,014,430 A | 3/1977 | Beaty, Jr. et al. | |
| 4,015,723 A | 4/1977 | Beaty, Jr. et al. | |

(Continued)

FOREIGN PATENT DOCUMENTS

CA   2337609 A1   1/2000

(Continued)

OTHER PUBLICATIONS

Hall, Intelligent Robot Trends for 1998, Internet, p. 1-13.*

(Continued)

*Primary Examiner* — James P Trammell
*Assistant Examiner* — McDieunel Marc
(74) *Attorney, Agent, or Firm* — Dorsey & Whitney LLP; Nathan J. Witzany, Esq.

(57) ABSTRACT

In one aspect, a programmable load forming system is programmed to perform the method of downloading a calculated path from the computer to the robot controller, moving one or more bundles along the calculated path to position the one or more bundles in a predetermined stacking position of a stacking pattern using the robot, and determining if the robot has completed moving along the calculated path. The calculated path is defined, in part, by the stacking pattern and other parameters such as, for example, bundle geometry, bundle levelness, bundle compressibility, among other parameters. In another aspect, the system is programmed to perform a method of sensing the top of a bundle and controllably placing a bundle. Additional aspects are directed to systems and methods of safely operating the robot and an inventive hopper design for holding bottom/tie sheets.

21 Claims, 5 Drawing Sheets

U.S. PATENT DOCUMENTS

| | | | |
|---|---|---|---|
| 4,015,732 A | 4/1977 | Beaty, Jr. et al. | |
| 4,019,639 A | 4/1977 | Stobb | |
| 4,030,318 A | 6/1977 | Kelley et al. | |
| 4,073,387 A | 2/1978 | Bowser | |
| 4,076,131 A | 2/1978 | Dahlstrom et al. | |
| 4,088,221 A | 5/1978 | Bowser | |
| 4,108,061 A | 8/1978 | Bowser | |
| 4,132,321 A | 1/1979 | Bowlby et al. | |
| 4,214,848 A | 7/1980 | Verwey et al. | |
| 4,260,309 A | 4/1981 | Lynn | |
| 4,271,755 A | 6/1981 | Kintgen | |
| 4,348,623 A | 9/1982 | Kobayashi et al. | |
| 4,356,554 A | 10/1982 | Susnjara et al. | |
| 4,379,335 A | 4/1983 | Kirsch et al. | |
| 4,393,728 A | 7/1983 | Larson et al. | |
| 4,408,286 A | 10/1983 | Kikuchi et al. | |
| 4,424,472 A | 1/1984 | Jacot-Descombes et al. | |
| 4,439,084 A | 3/1984 | Werkheiser | |
| 4,439,097 A | 3/1984 | Mebus | |
| 4,445,184 A | 4/1984 | Noguchi | |
| 4,453,085 A | 6/1984 | Pryor | |
| 4,460,826 A | 7/1984 | Pryor | |
| 4,481,569 A | 11/1984 | Hoodbhoy | |
| 4,482,960 A | 11/1984 | Pryor | |
| 4,488,241 A | 12/1984 | Hutchins et al. | |
| 4,494,417 A | 1/1985 | Lasrson et al. | |
| 4,495,453 A | 1/1985 | Inaba et al. | |
| 4,504,728 A | 3/1985 | Ukai et al. | |
| 4,505,166 A | 3/1985 | Tesar | |
| 4,512,701 A | 4/1985 | Foust et al. | |
| 4,523,100 A | 6/1985 | Payne | |
| 4,536,119 A | 8/1985 | Miaskoff | |
| 4,552,499 A | 11/1985 | Foust et al. | |
| 4,553,077 A | 11/1985 | Brantmark et al. | |
| 4,578,562 A | 3/1986 | Lindstrom et al. | |
| 4,586,151 A | 4/1986 | Buote | |
| 4,587,716 A | 5/1986 | Bytow | |
| 4,597,707 A | 7/1986 | Cornacchia | |
| 4,611,377 A | 9/1986 | McCormick et al. | |
| 4,613,803 A | 9/1986 | Hasegawa et al. | |
| 4,616,326 A | 10/1986 | Meier et al. | |
| 4,620,830 A | 11/1986 | Tsuchihasi et al. | |
| 4,633,414 A | 12/1986 | Yabe et al. | |
| 4,638,143 A | 1/1987 | Akeel | |
| 4,642,540 A | 2/1987 | LeMay | |
| 4,659,902 A | 4/1987 | Swensrud et al. | |
| 4,665,558 A | 5/1987 | Burke | |
| 4,669,602 A | 6/1987 | Ouellette | |
| 4,670,641 A | 6/1987 | Porsander et al. | |
| 4,674,048 A | 6/1987 | Okumura | |
| 4,676,142 A | 6/1987 | McCormick et al. | |
| 4,688,983 A | 8/1987 | Lindbom | |
| 4,689,755 A | 8/1987 | Buote | |
| 4,692,876 A * | 9/1987 | Tenma et al. | 700/249 |
| 4,696,612 A | 9/1987 | Germond et al. | |
| 4,716,350 A | 12/1987 | Huang et al. | |
| 4,718,078 A | 1/1988 | Bleidorn et al. | |
| 4,727,494 A | 2/1988 | Buote | |
| 4,741,414 A | 5/1988 | Classen | |
| 4,763,055 A | 8/1988 | Daggett et al. | |
| 4,769,700 A | 9/1988 | Pryor | |
| 4,772,831 A | 9/1988 | Casler, Jr. et al. | |
| 4,773,025 A | 9/1988 | Penkar et al. | |
| 4,774,445 A | 9/1988 | Penkar | |
| 4,786,229 A | 11/1988 | Henderson | |
| 4,789,940 A | 12/1988 | Christian | |
| 4,795,296 A | 1/1989 | Jau | |
| RE32,854 E | 2/1989 | McCormick et al. | |
| 4,807,153 A | 2/1989 | Onaga et al. | |
| 4,815,007 A | 3/1989 | Sakai et al. | |
| 4,819,184 A | 4/1989 | Jonsson et al. | |
| 4,823,279 A | 4/1989 | Perzley et al. | |
| 4,829,219 A | 5/1989 | Penkar | |
| 4,831,232 A | 5/1989 | Andersson et al. | |
| 4,834,308 A | 5/1989 | Maccaferri | |
| 4,851,748 A | 7/1989 | Daggett et al. | |
| 4,864,204 A | 9/1989 | Daggett et al. | |
| 4,868,472 A | 9/1989 | Daggett | |
| 4,868,474 A | 9/1989 | Lancraft et al. | |
| 4,873,476 A | 10/1989 | Kurakake et al. | |
| 4,874,997 A | 10/1989 | Daggett et al. | |
| 4,874,998 A | 10/1989 | Hollis, Jr. | |
| 4,876,494 A | 10/1989 | Daggett et al. | |
| 4,887,223 A | 12/1989 | Christian | |
| 4,894,598 A | 1/1990 | Daggett | |
| 4,899,095 A | 2/1990 | Kishi et al. | |
| 4,900,218 A | 2/1990 | Sutherland | |
| 4,902,944 A | 2/1990 | Daggett et al. | |
| 4,908,556 A | 3/1990 | Daggett et al. | |
| 4,912,753 A | 3/1990 | Evans, Jr. | |
| 4,925,312 A | 5/1990 | Onaga et al. | |
| 4,937,759 A | 6/1990 | Vold | |
| 4,941,103 A | 7/1990 | Kato | |
| 4,942,512 A | 7/1990 | Kohono | |
| 4,954,761 A | 9/1990 | Kimura et al. | |
| 4,962,338 A | 10/1990 | Daggett et al. | |
| 4,970,448 A | 11/1990 | Torii et al. | |
| 4,973,215 A | 11/1990 | Karlen et al. | |
| 4,980,838 A | 12/1990 | Daggett et al. | |
| 4,993,912 A | 2/1991 | King et al. | |
| 5,038,089 A | 8/1991 | Szakaly | |
| 5,049,797 A | 9/1991 | Phillips | |
| 5,072,572 A | 12/1991 | Meives et al. | |
| 5,079,491 A | 1/1992 | Nose et al. | |
| 5,089,758 A | 2/1992 | Sogawa | |
| 5,098,254 A | 3/1992 | Becicka et al. | |
| 5,100,138 A | 3/1992 | Wilde | |
| 5,121,805 A | 6/1992 | Collie | |
| 5,144,211 A | 9/1992 | Daggett et al. | |
| 5,159,249 A | 10/1992 | Megherbi | |
| 5,188,211 A | 2/1993 | Ringot et al. | |
| 5,204,598 A | 4/1993 | Torii et al. | |
| 5,204,942 A | 4/1993 | Otera et al. | |
| 5,241,249 A | 8/1993 | Detriche | |
| 5,265,194 A | 11/1993 | Kanamori | |
| 5,271,686 A | 12/1993 | Herring, Jr. et al. | |
| 5,280,179 A | 1/1994 | Pryor et al. | |
| 5,280,431 A | 1/1994 | Summerville et al. | |
| 5,303,333 A | 4/1994 | Hoos | |
| 5,305,427 A | 4/1994 | Nagata | |
| 5,305,883 A | 4/1994 | Gage et al. | |
| 5,323,867 A | 6/1994 | Griffin et al. | |
| 5,327,058 A | 7/1994 | Rembutsu | |
| 5,337,846 A | 8/1994 | Ogaki et al. | |
| 5,350,269 A | 9/1994 | Azuma et al. | |
| 5,363,185 A | 11/1994 | Zana | |
| 5,369,568 A | 11/1994 | Song | |
| 5,373,221 A | 12/1994 | McGee et al. | |
| 5,377,310 A | 12/1994 | Jain et al. | |
| 5,400,244 A | 3/1995 | Watanabe et al. | |
| 5,443,436 A | 8/1995 | Kawakami et al. | |
| RE35,066 E | 10/1995 | Martin | |
| 5,457,773 A | 10/1995 | Usui | |
| 5,458,455 A * | 10/1995 | Oyama et al. | 414/791.1 |
| 5,477,556 A | 12/1995 | Chung | |
| 5,488,689 A | 1/1996 | Yamato et al. | |
| 5,500,470 A | 3/1996 | Mirle et al. | |
| 5,501,571 A | 3/1996 | Van Durrett et al. | |
| 5,506,787 A | 4/1996 | Muhfield et al. | |
| 5,511,147 A | 4/1996 | Abdel-Malek | |
| 5,525,029 A * | 6/1996 | Taylor | 414/788.1 |
| 5,554,914 A | 9/1996 | Miyazawa | |
| 5,564,312 A | 10/1996 | Brunman et al. | |
| 5,567,110 A | 10/1996 | Sutherland | |
| 5,576,605 A | 11/1996 | Miyazawa | |
| 5,581,166 A | 12/1996 | Eismann et al. | |
| 5,610,488 A | 3/1997 | Miyazawa | |
| 5,617,515 A | 4/1997 | MacLaren et al. | |
| 5,636,966 A * | 6/1997 | Lyon et al. | 414/791.6 |
| 5,644,204 A | 7/1997 | Nagle | |
| 5,708,342 A | 1/1998 | Nihei et al. | |
| 5,711,697 A | 1/1998 | Taninaga et al. | |
| 5,720,010 A | 2/1998 | Watanabe et al. | |
| 5,730,579 A | 3/1998 | Keck et al. | |
| 5,733,098 A * | 3/1998 | Lyon et al. | 414/802 |
| 5,738,484 A * | 4/1998 | Taylor | 414/788.1 |
| 5,813,826 A | 9/1998 | Martin et al. | |

| | | |
|---|---|---|
| 5,814,959 A | 9/1998 | Nonaka et al. |
| 5,825,981 A | 10/1998 | Matsuda |
| 5,835,684 A | 11/1998 | Bourne et al. |
| 5,838,121 A | 11/1998 | Fairbairn et al. |
| 5,841,258 A | 11/1998 | Takenaka |
| 5,889,926 A | 3/1999 | Bourne et al. |
| 5,934,864 A * | 8/1999 | Lyon et al. ............... 414/791.6 |
| 5,959,423 A | 9/1999 | Nakanishi et al. |
| 5,988,850 A | 11/1999 | Kumiya |
| 5,994,864 A | 11/1999 | Inoue et al. |
| 6,021,361 A | 2/2000 | Taninata et al. |
| 6,064,167 A | 5/2000 | Takenaka et al. |
| 6,070,109 A | 5/2000 | McGee et al. |
| 6,075,334 A | 6/2000 | Sagues et al. |
| 6,091,219 A | 7/2000 | Maruo et al. |
| 6,106,221 A | 8/2000 | Manuszak et al. |
| 6,126,383 A | 10/2000 | Franklin et al. |
| 6,134,486 A | 10/2000 | Kanayama |
| 6,170,634 B1 * | 1/2001 | Jaquet ...................... 198/347.1 |
| 6,181,096 B1 | 1/2001 | Hashimoto et al. |
| 6,196,787 B1 | 3/2001 | Manuszak et al. |
| 6,232,735 B1 | 5/2001 | Baba et al. |
| 6,242,879 B1 | 6/2001 | Sagues et al. |
| 6,256,553 B1 * | 7/2001 | Erikkila ....................... 700/213 |
| 6,266,576 B1 | 7/2001 | Okada et al. |
| 6,278,902 B1 | 8/2001 | Hashimoto et al. |
| 6,340,875 B1 | 1/2002 | Watanabe et al. |
| 6,353,774 B1 * | 3/2002 | Goldenberg et al. ......... 700/245 |
| 6,356,806 B1 * | 3/2002 | Grob et al. .................... 700/245 |
| 6,374,156 B1 | 4/2002 | Shimogama et al. |
| 6,377,013 B2 | 4/2002 | Suzuki |
| 6,396,030 B1 | 5/2002 | Hashimoto et al. |
| 6,430,471 B1 | 8/2002 | Kintou et al. |
| 6,430,472 B1 | 8/2002 | Boillot et al. |
| 6,442,451 B1 | 8/2002 | Lapham |
| 6,453,213 B1 | 9/2002 | Hong |
| 6,456,901 B1 | 9/2002 | Ki et al. |
| 6,472,838 B1 | 10/2002 | Shikazano et al. |
| 6,472,839 B1 | 10/2002 | Ishii et al. |
| 6,476,574 B1 | 11/2002 | Liao |
| 6,480,761 B2 | 11/2002 | Ueno et al. |
| 6,484,083 B1 | 11/2002 | Hayward et al. |
| 6,493,607 B1 | 12/2002 | Bourne et al. |
| 6,526,329 B2 | 2/2003 | Tateyama et al. |
| 6,526,332 B2 | 2/2003 | Sakamoto et al. |
| 6,560,512 B1 | 5/2003 | Rosen et al. |
| 6,579,053 B1 * | 6/2003 | Grams et al. .................. 414/269 |
| 6,584,377 B2 | 6/2003 | Saijo et al. |
| 6,650,965 B2 | 11/2003 | Takagki et al. |
| 6,658,816 B1 | 12/2003 | Parker et al. |
| 6,674,259 B1 | 1/2004 | Norman et al. |
| 6,684,131 B2 | 1/2004 | Hashimoto et al. |
| 6,696,809 B2 | 2/2004 | Ishii et al. |
| 6,760,648 B2 | 7/2004 | Sakamoto et al. |
| 6,763,282 B2 | 7/2004 | Glenn et al. |
| 6,871,893 B2 * | 3/2005 | Langston et al. ............... 294/113 |
| 7,013,198 B2 * | 3/2006 | Haas .............................. 700/218 |
| 2001/0001318 A1 | 5/2001 | Kamiya et al. |
| 2001/0002448 A1 | 5/2001 | Wilson et al. |
| 2001/0006334 A1 | 7/2001 | Suzuki |
| 2001/0008052 A1 | 7/2001 | Kato et al. |
| 2001/0008615 A1 | 7/2001 | Little et al. |
| 2001/0010539 A1 | 8/2001 | Arimatsu |
| 2001/0015346 A1 | 8/2001 | Kanjo |
| 2001/0017313 A1 | 8/2001 | Mays et al. |
| 2001/0019897 A1 | 9/2001 | Kumar et al. |
| 2001/0020200 A1 | 9/2001 | Das et al. |
| 2001/0020516 A1 | 9/2001 | Khan et al. |
| 2001/0021337 A1 | 9/2001 | Murata et al. |
| 2001/0023163 A1 | 9/2001 | Kinbara et al. |
| 2001/0025836 A1 | 10/2001 | Shimogama et al. |
| 2001/0027597 A1 | 10/2001 | Mauer |
| 2001/0028175 A1 | 10/2001 | Thompson et al. |
| 2001/0029406 A1 | 10/2001 | Okamoto et al. |
| 2001/0032830 A1 | 10/2001 | McCormick |
| 2001/0034155 A1 | 10/2001 | Shimogama et al. |
| 2001/0039718 A1 | 11/2001 | Mauer et al. |
| 2001/0051439 A1 | 12/2001 | Khan et al. |
| 2001/0053407 A1 | 12/2001 | Becker et al. |
| 2001/0055063 A1 | 12/2001 | Nagai et al. |
| 2001/0056484 A1 | 12/2001 | Blumenstock |
| 2002/0002424 A1 | 1/2002 | Born et al. |
| 2002/0003540 A1 | 1/2002 | Unuma et al. |
| 2002/0005099 A1 | 1/2002 | Otsuka |
| 2002/0009394 A1 | 1/2002 | Koster et al. |
| 2002/0015934 A1 | 2/2002 | Rubbert et al. |
| 2002/0016647 A1 | 2/2002 | Bourne et al. |
| 2002/0016650 A1 | 2/2002 | Beckhart et al. |
| 2002/0016665 A1 | 2/2002 | Ulyanov et al. |
| 2002/0029095 A1 | 3/2002 | Kosaka et al. |
| 2002/0029450 A1 | 3/2002 | Kondo |
| 2002/0032972 A1 | 3/2002 | Kato et al. |
| 2002/0039183 A1 | 4/2002 | Yagita |
| 2002/0042267 A1 | 4/2002 | Kim et al. |
| 2002/0049515 A1 | 4/2002 | Osawa |
| 2002/0050195 A1 | 5/2002 | Matsumoto et al. |
| 2002/0050200 A1 | 5/2002 | Matsumoto et al. |
| 2002/0050736 A1 | 5/2002 | Maloney et al. |
| 2002/0052672 A1 | 5/2002 | Osawa |
| 2002/0052717 A1 | 5/2002 | Roth et al. |
| 2002/0057279 A1 | 5/2002 | Jouppi |
| 2002/0062167 A1 | 5/2002 | Dimitri et al. |
| 2002/0062176 A1 | 5/2002 | Fujita |
| 2002/0068992 A1 | 6/2002 | Hine et al. |
| 2002/0068994 A1 | 6/2002 | Hong |
| 2002/0068995 A1 | 6/2002 | Yoshida |
| 2002/0073683 A1 | 6/2002 | Zipperer |
| 2002/0077725 A1 | 6/2002 | Bancroft et al. |
| 2002/0079857 A1 | 6/2002 | Ishii et al. |
| 2002/0081937 A1 | 6/2002 | Yamada et al. |
| 2002/0087232 A1 | 7/2002 | Lapham |
| 2002/0087498 A1 | 7/2002 | Yoshida |
| 2002/0091747 A1 | 7/2002 | Rehg et al. |
| 2002/0091748 A1 | 7/2002 | Rehg et al. |
| 2002/0092801 A1 | 7/2002 | Dominguez |
| 2002/0095238 A1 | 7/2002 | Ahlin et al. |
| 2002/0098534 A1 | 7/2002 | McCaskeu-Feazel et al. |
| 2002/0103575 A1 | 8/2002 | Sugawara |
| 2002/0103576 A1 | 8/2002 | Takemura et al. |
| 2002/0107611 A1 | 8/2002 | Son |
| 2002/0108857 A1 | 8/2002 | Paschetto |
| 2002/0116295 A1 | 8/2002 | Shino et al. |
| 2002/0117487 A1 | 8/2002 | Corby |
| 2002/0120361 A1 | 8/2002 | Kuroki et al. |
| 2002/0120362 A1 | 8/2002 | Lathan |
| 2002/0123826 A1 | 9/2002 | Toki |
| 2002/0131848 A1 | 9/2002 | Kurata |
| 2002/0138175 A1 | 9/2002 | Fujita et al. |
| 2002/0142102 A1 | 10/2002 | Romine |
| 2002/0144565 A1 | 10/2002 | Ambrose |
| 2002/0145217 A1 | 10/2002 | Boyd et al. |
| 2002/0152006 A1 | 10/2002 | Bennett et al. |
| 2002/0153117 A1 | 10/2002 | Allor et al. |
| 2002/0153121 A1 | 10/2002 | Allor et al. |
| 2002/0161478 A1 | 10/2002 | Ikeda et al. |
| 2002/0167604 A1 | 11/2002 | Ban et al. |
| 2002/0173877 A1 | 11/2002 | Zweig |
| 2002/0173879 A1 | 11/2002 | Sakamoto et al. |
| 2002/0174506 A1 | 11/2002 | Wallach et al. |
| 2002/0174968 A1 | 11/2002 | Mertins |
| 2002/0178692 A1 | 12/2002 | Panzarella et al. |
| 2002/0180393 A1 | 12/2002 | Slater et al. |
| 2002/0184248 A1 | 12/2002 | Kachi |
| 2003/0000269 A1 | 1/2003 | Koyama et al. |
| 2003/0004612 A1 | 1/2003 | Domanico et al. |
| 2003/0009259 A1 | 1/2003 | Hattori et al. |
| 2003/0010887 A1 | 1/2003 | Potempka |
| 2003/0014158 A1 | 1/2003 | Berger |
| 2003/0014191 A1 | 1/2003 | Agrafiotis et al. |
| 2003/0015207 A1 | 1/2003 | Herold et al. |
| 2003/0017032 A1 | 1/2003 | Olesen et al. |
| 2003/0023333 A1 | 1/2003 | Birkle |
| 2003/0023347 A1 | 1/2003 | Konno et al. |
| 2003/0025472 A1 | 2/2003 | Jones et al. |
| 2003/0025893 A1 | 2/2003 | Nishi |
| 2003/0028284 A1 | 2/2003 | Chirnomas |
| 2003/0028286 A1 | 2/2003 | Glenn et al. |
| 2003/0030397 A1 | 2/2003 | Simmons |

| | | |
|---|---|---|
| 2003/0031549 A1 | 2/2003 | Berger et al. |
| 2003/0037515 A1 | 2/2003 | Herzog |
| 2003/0037620 A1 | 2/2003 | Mansky |
| 2003/0038025 A1 | 2/2003 | Ngan et al. |
| 2003/0040840 A1 | 2/2003 | Hirayama et al. |
| 2003/0041663 A1 | 3/2003 | Kossuth et al. |
| 2003/0046801 A1 | 3/2003 | Engstrom et al. |
| 2003/0050729 A1 | 3/2003 | Bashma et al. |
| 2003/0050734 A1 | 3/2003 | Lapham |
| 2003/0054740 A1 | 3/2003 | Mansky |
| 2003/0055653 A1 | 3/2003 | Ishii et al. |
| 2003/0056561 A1 | 3/2003 | Butscher et al. |
| 2003/0060808 A1 | 3/2003 | Wilk |
| 2003/0060922 A1 | 3/2003 | Schauer et al. |
| 2003/0060929 A1 | 3/2003 | Kullborg |
| 2003/0060931 A1 | 3/2003 | Kumar et al. |
| 2003/0063966 A1 | 4/2003 | Apple et al. |
| 2003/0065421 A1 | 4/2003 | Didriksen et al. |
| 2003/0066619 A1 | 4/2003 | Mertins et al. |
| 2003/0070468 A1 | 4/2003 | Butscher et al. |
| 2003/0074102 A1 | 4/2003 | Mauer et al. |
| 2003/0074945 A1 | 4/2003 | Butscher et al. |
| 2003/0075296 A1 | 4/2003 | Mertins |
| 2003/0075298 A1 | 4/2003 | Mertins |
| 2003/0075838 A1 | 4/2003 | Vardin et al. |
| 2003/0078694 A1 | 4/2003 | Watanabe et al. |
| 2003/0079207 A1 | 4/2003 | Xavier et al. |
| 2003/0079218 A1 | 4/2003 | Goldberg et al. |
| 2003/0079331 A1 | 5/2003 | Batrin et al. |
| 2003/0083776 A1 | 5/2003 | Schauer et al. |
| 2003/0087040 A1 | 5/2003 | Ladentin |
| 2003/0088336 A1 | 5/2003 | Osawa |
| 2003/0088530 A1 | 5/2003 | Ramann |
| 2003/0091420 A1* | 5/2003 | Langston et al. .......... 414/792.9 |
| 2003/0093392 A1 | 5/2003 | Ulyanov |
| 2003/0096210 A1 | 5/2003 | Rubbert et al. |
| 2003/0096426 A1 | 5/2003 | Little et al. |
| 2003/0097871 A1 | 5/2003 | Mansky |
| 2003/0102367 A1 | 6/2003 | Monette et al. |
| 2003/0105534 A1 | 6/2003 | Hara et al. |
| 2003/0109094 A1 | 6/2003 | Seidel et al. |
| 2003/0109959 A1 | 6/2003 | Tajima et al. |
| 2003/0110385 A1 | 6/2003 | Golobrodsky et al. |
| 2003/0111203 A1 | 6/2003 | Mertins |
| 2003/0114959 A1 | 6/2003 | Sakamoto et al. |
| 2003/0118436 A1 | 6/2003 | Kameda |
| 2003/0120183 A1 | 6/2003 | Simmons |
| 2003/0120283 A1 | 6/2003 | Stoianovici et al. |
| 2003/0120385 A1 | 6/2003 | Etienne-Cummings et al. |
| 2003/0123970 A1 | 7/2003 | Grams et al. |
| 2003/0125644 A1 | 7/2003 | Hamamoto et al. |
| 2003/0126352 A1 | 7/2003 | Barrett |
| 2003/0127124 A1 | 7/2003 | Jones et al. |
| 2003/0130829 A1 | 7/2003 | Hamamoto et al. |
| 2003/0130851 A1 | 7/2003 | Nakakita et al. |
| 2003/0135203 A1 | 7/2003 | Wang et al. |
| 2003/0135302 A1 | 7/2003 | Hung et al. |
| 2003/0135303 A1 | 7/2003 | Arai et al. |
| 2003/0139849 A1 | 7/2003 | Kuroki et al. |
| 2003/0139850 A1 | 7/2003 | Sakamoto et al. |
| 2003/0141155 A1 | 7/2003 | Daneryd et al. |
| 2003/0144649 A1 | 7/2003 | Ghodoussi et al. |
| 2003/0144763 A1 | 7/2003 | Mori et al. |
| 2003/0146379 A1 | 8/2003 | Kadyshevitch et al. |
| 2003/0146381 A1 | 8/2003 | Simon et al. |
| 2003/0148539 A1 | 8/2003 | Van Dam et al. |
| 2003/0149676 A1 | 8/2003 | Kasabov |
| 2003/0152884 A1 | 8/2003 | Wiechmann et al. |
| 2003/0154925 A1 | 8/2003 | Van Den Berg et al. |
| 2003/0155073 A1 | 8/2003 | Komandu et al. |
| 2003/0164200 A1 | 9/2003 | Czeranna et al. |
| 2003/0170098 A1 | 9/2003 | Motley et al. |
| 2003/0171846 A1 | 9/2003 | Murray et al. |
| 2003/0172075 A1 | 9/2003 | Reisman |
| 2003/0172834 A1 | 9/2003 | De-Gol |
| 2003/0179916 A1 | 9/2003 | Magnuson |
| 2003/0187547 A1 | 10/2003 | Naka et al. |
| 2003/0188304 A1 | 10/2003 | Goodman et al. |
| 2003/0191507 A1 | 10/2003 | Simmons |
| 2003/0193236 A1 | 10/2003 | Maloney et al. |
| 2003/0195658 A1 | 10/2003 | Takano |
| 2003/0196000 A1 | 10/2003 | Magnussen |
| 2003/0196528 A1 | 10/2003 | Cooper |
| 2003/0207655 A1 | 11/2003 | Jackson |
| 2003/0208303 A1 | 11/2003 | Okamoto et al. |
| 2003/0212489 A1 | 11/2003 | Georgeson et al. |
| 2003/0213896 A1 | 11/2003 | Stridsberg |
| 2003/0216822 A1 | 11/2003 | Sato |
| 2003/0216833 A1 | 11/2003 | Mukai et al. |
| 2003/0217020 A1 | 11/2003 | Tokuda et al. |
| 2003/0220715 A1 | 11/2003 | Kneifel et al. |
| 2003/0225479 A1 | 12/2003 | Waled |
| 2003/0226002 A1 | 12/2003 | Boutaud et al. |
| 2003/0229420 A1 | 12/2003 | Buckingham et al. |
| 2003/0233171 A1 | 12/2003 | Heiligensetzer |
| 2003/0236590 A1 | 12/2003 | Park et al. |
| 2004/0006415 A1 | 1/2004 | Kang |
| 2004/0006416 A1 | 1/2004 | Jeong |
| 2004/0006864 A1 | 1/2004 | Batrin |
| 2004/0007445 A1 | 1/2004 | Demarest et al. |
| 2004/0010342 A1 | 1/2004 | Thelen |
| 2004/0010344 A1 | 1/2004 | Hiratsuka |
| 2004/0010568 A1 | 1/2004 | Goodman et al. |
| 2004/0012363 A1 | 1/2004 | Simondet |
| 2004/0015933 A1 | 1/2004 | Campos et al. |
| 2004/0017181 A1 | 1/2004 | Sakai |
| 2004/0019402 A1 | 1/2004 | Bourne et al. |
| 2004/0021076 A1 | 2/2004 | Kadyshevitch et al. |
| 2004/0026026 A1 | 2/2004 | Habisreitinger et al. |
| 2004/0029558 A1 | 2/2004 | Liu |
| 2004/0030414 A1 | 2/2004 | Koza et al. |
| 2004/0030447 A1 | 2/2004 | Takahashi |
| 2004/0030452 A1 | 2/2004 | Graf |
| 2004/0030453 A1 | 2/2004 | Graf |
| 2004/0034448 A1 | 2/2004 | Siegers |
| 2004/0034683 A1 | 2/2004 | Zhao |
| 2004/0035989 A1 | 2/2004 | Sweere et al. |
| 2004/0036437 A1 | 2/2004 | Ito |
| 2004/0045945 A1 | 3/2004 | Shimogama et al. |
| 2004/0054437 A1 | 3/2004 | Kimura et al. |
| 2004/0056625 A1 | 3/2004 | Sano et al. |
| 2004/0068333 A1 | 4/2004 | Cantello et al. |
| 2004/0068335 A1 | 4/2004 | Ferla et al. |
| 2004/0071518 A1 | 4/2004 | Murata et al. |
| 2004/0073335 A1 | 4/2004 | Gong |
| 2004/0073368 A1 | 4/2004 | Gonzalez-Banos et al. |
| 2004/0074823 A1 | 4/2004 | Brust et al. |
| 2004/0075288 A1 | 4/2004 | Baker |
| 2004/0078116 A1 | 4/2004 | Hashimoto et al. |
| 2004/0084622 A1 | 5/2004 | Kadyshevitch et al. |
| 2004/0085037 A1 | 5/2004 | Jones et al. |
| 2004/0088119 A1 | 5/2004 | Landgraf |
| 2004/0089421 A1 | 5/2004 | Komandur et al. |
| 2004/0093120 A1 | 5/2004 | Ebisawa et al. |
| 2004/0093219 A1 | 5/2004 | Shin et al. |
| 2004/0096309 A1 | 5/2004 | Keller |
| 2004/0102135 A1 | 5/2004 | Wood et al. |
| 2004/0102862 A1 | 5/2004 | Kato et al. |
| 2004/0103739 A1 | 6/2004 | Brogardh et al. |
| 2004/0103740 A1 | 6/2004 | Townsend |
| 2004/0107026 A1 | 6/2004 | Kroth |
| 2004/0111183 A1 | 6/2004 | Sutherland et al. |
| 2004/0119201 A1 | 6/2004 | Burton et al. |
| 2004/0123567 A1 | 7/2004 | McErlean et al. |
| 2004/0124802 A1 | 7/2004 | Brogardh et al. |
| 2004/0128026 A1 | 7/2004 | Harris et al. |
| 2004/0128030 A1 | 7/2004 | Nagata et al. |
| 2004/0128097 A1 | 7/2004 | LaMarca |
| 2004/0129869 A1 | 7/2004 | Stridsberg |
| 2004/0133308 A1 | 7/2004 | Kato et al. |
| 2004/0133309 A1 | 7/2004 | Huttenhofer et al. |
| 2004/0133310 A1 | 7/2004 | Watanabe et al. |
| 2004/0133311 A1 | 7/2004 | Park et al. |
| 2004/0133312 A1 | 7/2004 | Watanabe et al. |
| 2004/0135280 A1 | 7/2004 | O-Nien et al. |
| 2004/0135792 A1 | 7/2004 | Yanovski et al. |
| 2004/0136374 A1 | 7/2004 | Ballard |
| 2004/0138779 A1 | 7/2004 | Shibata et al. |

| | | | | | | |
|---|---|---|---|---|---|---|
| 2004/0138780 | A1 | 7/2004 | Lewis | EP | 1040893 A2 | 10/2000 |
| 2004/0138782 | A1 | 7/2004 | Passmore et al. | EP | 1118436 A1 | 7/2001 |
| 2004/0139110 | A1 | 7/2004 | LaMarca et al. | EP | 1435553 A1 | 7/2004 |
| 2004/0139802 | A1 | 7/2004 | Gripp | FR | 2806025 A1 | 9/2001 |
| 2004/0142774 | A1 | 7/2004 | Kamen | KR | 8302787 | 12/1983 |
| 2004/0143369 | A1 | 7/2004 | Takenaka et al. | KR | 8501055 | 7/1985 |
| 2004/0144759 | A1 | 7/2004 | Cho et al. | KR | 9003637 | 5/1990 |
| 2004/0153211 | A1 | 8/2004 | Kamoto et al. | KR | 9307779 | 8/1993 |
| 2004/0153213 | A1 | 8/2004 | Lapham | KR | 9307780 | 8/1993 |
| 2004/0153430 | A1 | 8/2004 | Sayad | KR | 9307781 | 8/1993 |
| 2005/0113976 | A1* | 5/2005 | van der Meulen ............ 700/245 | KR | 9701360 | 2/1997 |
| 2005/0220599 | A1* | 10/2005 | Job et al. ....................... 414/626 | WO | WO 9938656 A1 | 8/1999 |
| | | | | WO | WO 0106905 A1 | 2/2001 |

FOREIGN PATENT DOCUMENTS

| | | |
|---|---|---|
| DE | 20023213 U1 | 6/2003 |
| EP | 0377939 A1 | 7/1990 |
| EP | 0269374 A2 | 6/1996 |
| EP | 0888990 A1 | 7/1997 |
| EP | 2751576 | 1/1998 |
| EP | 0945228 A1 | 9/1999 |
| EP | 1026560 A1 | 8/2000 |
| EP | 1038640 A2 | 9/2000 |
| WO | WO 0223297 A1 | 3/2002 |
| WO | WO 0234477 A2 | 5/2002 |
| WO | WO 03101675 A1 | 12/2003 |

OTHER PUBLICATIONS

Hernan I, An introduction to automated palletizing, 2000, Internet, p. 1-26.*

* cited by examiner

PROGRAMMABLE LOAD FORMING SYSTEM, COMPONENTS THEREOF, AND METHODS OF USE

CROSS-REFERENCE TO RELATED APPLICATIONS

This application claims the benefit of Provisional Application No. 60/616,578, filed on Oct. 5, 2004, the disclosure of which is incorporated herein by reference.

TECHNICAL FIELD

The invention relates to programmable load forming systems, components thereof, and methods for stacking bundles of un-erected boxes.

BACKGROUND OF THE INVENTION

Load forming systems are commonly used to stack bundles of un-erected corrugated boxes. Load forming systems transport, using a conveyor, bundles of un-erected boxes. The bundles are then typically conditioned by a centering unit, a rotator, and/or a doubler. Pusher forks are used to transfer the bundle from the rotator to the pick-up location. A robot having a movable arm with a gripping mechanism is used to pick-up and move the bundles to a desired location on another conveyor unit. The robot stacks the bundles according to how the robot controller is programmed. Thus, the robot is programmed to stack the bundles according to a specific stacking pattern. If the stacking pattern needs to be altered, the robot controller needs to be re-programmed. The re-programming of the robot controller is time consuming and inconvenient. It also requires down time for the robot, thus, not allowing the robot to be used for stacking bundles.

The bundles of un-erected boxes also tend to be inconsistent in height and shape. This is caused by glue flaps or warping that causes the bundles to be shaped like a wedge or to vary in height from bundle to bundle. Conventional load forming systems do not take into account the variation in bundle quality and geometry.

Accordingly, it would be desirable that a load forming system be able to be easily reprogrammed to facilitate altering stacking patterns and operate in a manner that improves the efficiency for stacking the bundles. It would also be desirable that the load forming system take into account the variability in the geometry of a bundle when stacking them.

SUMMARY OF THE INVENTION

The invention is directed to programmable load forming systems and methods of using and controlling programmable load forming systems. The programmable load forming systems may be used for stacking bundles of un-erected boxes.

In one aspect of the invention, a programmable load forming system and method includes a robot having a moveable arm configured to carry at least one bundle, and a robot controller. The system further includes a computer operably coupled to the robot controller, the computer programmed with instructions and operable to communicate the instructions to the robot controller. The instructions programmed into the computer enable the system to perform the method of downloading a calculated path from the computer to the robot controller, moving one or more bundles along the calculated path to position the one or more bundles in a predetermined stacking position of a stacking pattern using the robot, and determining if the robot has completed moving along the calculated path. The calculated path is defined, in part, by the stacking pattern and other parameters such as, for example, bundle geometry, bundle levelness, bundle compressibility, among other parameters. If the robot has completed moving along the calculated path, another calculated path may be download from the computer to the robot controller while the robot returns to pick-up one or more additional bundles. The one or more additional bundles may be moved along the second calculated path to position them in another predetermined stacking position of the stacking pattern using the robot. Thus, the above system and method may improve process throughput by downloading the next calculated path while the robot is returning to pick-up another bundle. Additionally, the operator may easily alter the stacking pattern through use of user interface of the computer.

Another aspect of the invention is directed to a programmable load forming system and method that is operable to stack bundles on one other in a manner that may help prevent misalignment during stacking of the bundles or accidentally knocking a bundle over. The system includes a robot having a moveable arm configured to carry one or more bundles, and a robot controller. The system includes a computer readable medium containing instructions to cause the robot to perform a method of lowering the one or more bundles onto the lower bundle using a gripping mechanism of a robot, allowing the gripping mechanism to move vertically a set distance responsive to the one or more bundles being lowered onto the lower bundle, upon the gripping mechanism moving the set distance the act of lowering the one or more bundles is stopped. Then, the gripping mechanism having one or more bundles retained thereon may be moved upwardly a predetermined distance in order to facilitate removing the gripping mechanism without disturbing the lower bundle.

Another aspect of the invention is directed to a programmable load forming system and method that is operable to move an arm of a robot to a position in which it is safe rotate the arm without physical interference from another component of the system. The system includes a robot having a moveable arm configured to carry at least one bundle, and a robot controller. The system includes a computer readable medium containing instructions to cause the robot to perform a method of stopping the moveable arm from moving along a path that the robot was instructed to move along and moving the gripping mechanism from a first location to a reference location in which the gripping mechanism can be rotated without physical interference from a part of the programmable load forming system without an operator determining the path that the gripping mechanism moves along.

In yet another aspect of the invention, a hopper for holding tie sheets and/or bottom sheets and configured for use in a programmable load forming system is disclosed. The hopper may be positioned adjacent to a tie/bottom sheet build zone conveyor of the programmable load forming system and includes a shelf structure having a plurality of shelves spaced apart from each other. Each of the shelves is not enclosed at one end to facilitate operator access thereto. The hopper further includes a plurality of cantilevered arms. Each of the shelves is associated with one of the cantilevered arms and each of the cantilevered arms is positioned over one of the shelves. Each of the cantilevered arms carries a sheet retention device that is operable to lift a tie/bottom sheet so that a sheet arm of the programmable load forming system can transport the tie/bottom sheet to the tie/bottom sheet build zone conveyor

DETAILED DESCRIPTION OF PREFERRED EMBODIMENTS

The invention is directed to programmable load forming systems, components thereof, and methods of using and controlling programmable load forming systems. The programmable load forming systems may be used for stacking bundles of un-erected boxes. The bundles may include boxes of un-erected, corrugated cardboard boxes that are strapped together or un-strapped. Many specific details of certain embodiments of the invention are set forth in the following description and FIGS. 1 through 5 in order to provide a thorough understanding of such embodiments. One skilled in the art, however, will understand that the invention may have additional embodiments, or that the invention may be practiced without several of the details described in the following description.

Figure 1:
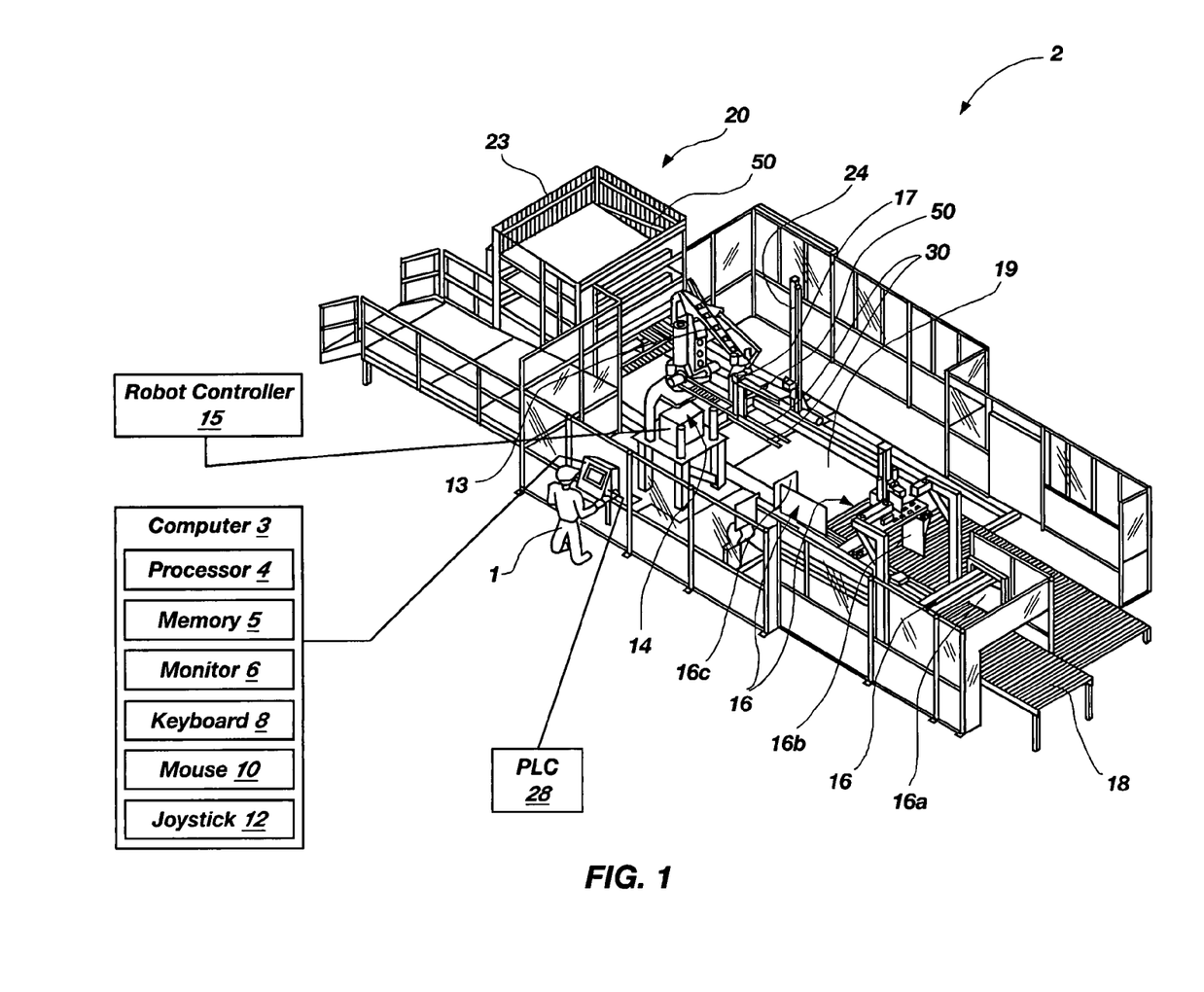
FIG. 1 is a schematic isometric view of a programmable load forming system according to one embodiment of the invention.

FIG. 1 shows a schematic isometric view of a programmable load forming system 2 according one embodiment of the invention. The programmable load forming system 2 is suitable for practicing various methods, which will be described in more detail below. The programmable load forming system 2 includes a computer 3, a robot 14, a bundle conditioner 16, a tie sheet/bottom sheet hopper 20, a conveyor 18, a bottom sheet build zone conveyor 21, a build zone conveyor 19, and a sheet arm 24. The computer 3 includes at least one processor 4, memory 5, a monitor 6 (which may be a touch screen). As is well-known in the art, the memory 5 stores a program of instructions that are executed by the processor 4. The computer 3 may also include at least one additional input device such as a keyboard 8, and a mouse 10. A joystick 12 may be operably coupled to a programmable logic circuit (PLC) 26, which communicates with the computer 3. The robot 14 further includes a robot controller 15 that receives instructions from the computer 3 that causes the robot 14 to perform specified functions, which will be discussed in more detail below with respect to FIGS. 4 and 5, and a movable arm 13 having a gripping mechanism 17 configured for gripping and carrying bundles to a selected location. The gripping mechanism 17 includes an upper member 50 and a retractable pair of forks 30 configured for gripping one or more bundles therebetween. One suitable robot that may be used for the robot 14 is the Fanuc M410i series commercially available from Fanuc Robotics of Rochester Hills, Mich.

With continued reference to FIG. 1, the conveyor 18 is configured and operable for moving bundles to a bundle conditioner 16 that may rotate, center, separate, and/or double bundles. The bundle conditioner 16 may include a centering unit 16a for aligning bundles that are being moved on the conveyor 18 and are off center or rotated, a combined doubler/rotator 16b for rotating and stacking bundles on top of each other, and a bundle presentation system 16c that accumulates bundles processed by the centering unit 16a and doubler/rotator 16b. Pusher forks are used to transfer the bundles from the doubler to the pick-up location for the robot 14 to pick them up. The programmable load forming system 2 also includes the bottom sheet build zone conveyor 21 and the build zone conveyor 19. In operation, the sheet arm 24 places bottom sheets on the bottom sheet build zone conveyor 21, which transfers the bottom sheets to the build zone conveyor 19. The robot 14 is operable to stack bundles on the bottom sheets situated on the conveyor of the build zone conveyor 19, which after stacking in the desired stack pattern, moves the stack away from the build zone.

Figure 2:
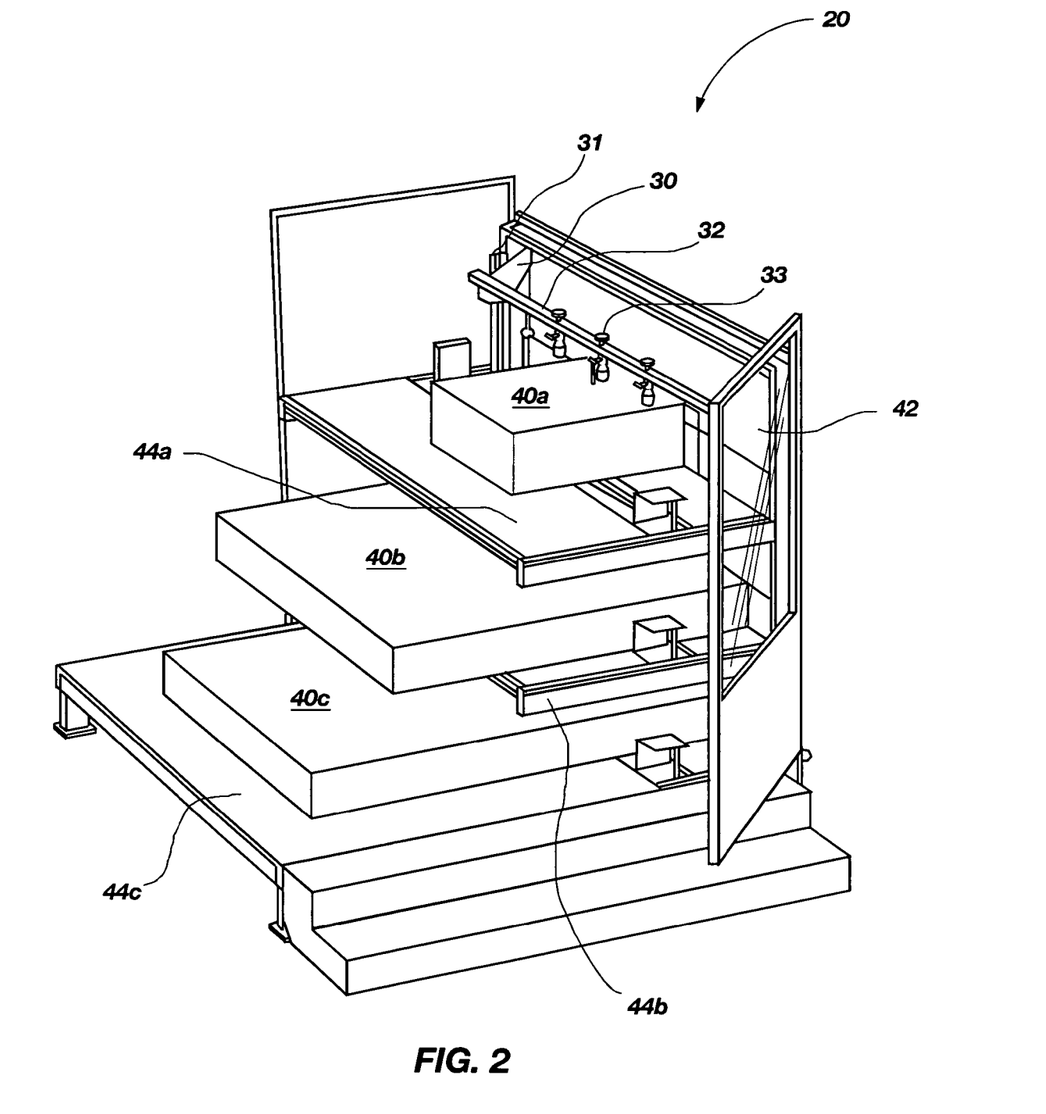
FIGS. 2 and 3 are schematic isometric views of a hopper that may used for holding bottom and tie sheets according to one embodiment of the invention.
Figure 3:
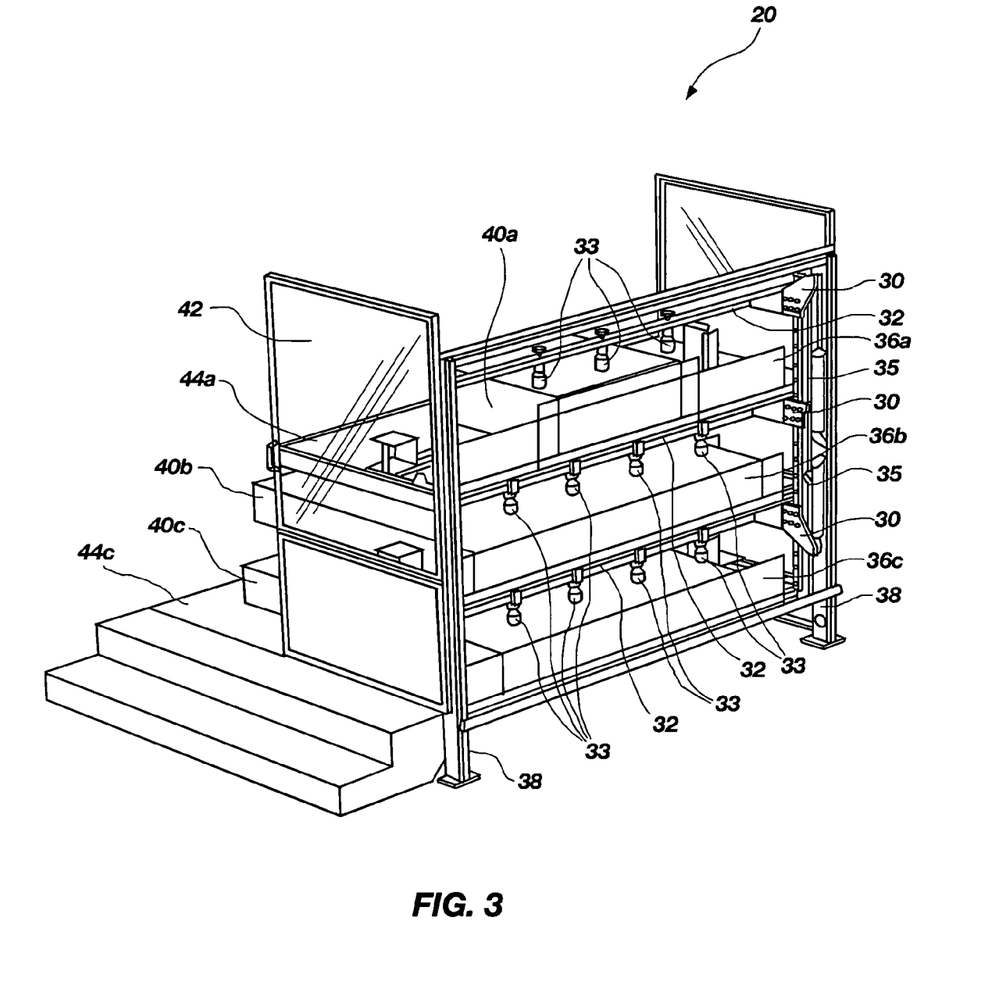

Turning now to FIGS. 2 and 3, the tie sheet/bottom sheet hopper 20 may include a plurality of horizontal supports (i.e., shelves) for holding stacks of tie sheets/bottom sheets. Although the hopper 20 is shown in FIG. 1 with a rear wall 23, in some embodiments, the rear wall 23 may be removed to enable the operator 1 to have access to each of the drawers thereby facilitating refilling each of the drawers with sheets without having to stop operation of the programmable load forming system 2. Each of the shelves further includes an actuated cantilevered arm 30 with a cross member 32 that carries suction devices configured to pick-up a tie sheet/bottom sheet using a vacuum force. The cantilever arm may be actuated using an air cylinder. The cantilevered arm 30 is operable to raise a sheet from the stack of sheets, which is then grabbed by a clamp of the sheet arm 24 (not shown in FIGS. 2 and 3, see FIG. 1) that is guided along side rails 26. The sheet arm 24 and the cantilevered arm 30, along with its associated vacuum system, are operable under control of the PLC 26. The sheet arm 24 moves the sheet that is grabbed thereby to a selected location of the build zone or on a bundle or bundles while a stack pattern is being built. The clamp of the sheet arm 24 releases the sheet on the selected location and moves along side rails 26 to either pick-up another sheet from located on of the horizontal supports 44a-44c or out of the way so that the robot 14 may continue stacking bundles. The PLC 26 that controls the sheet arm 24 and the cantilevered arm 30 including its associated suction devices 33 communicates with the robot controller 15 so that a tie sheet/bottom sheet is placed on the build zone conveyor 19 at a selected time during the stacking process. For example, a bottom sheet or a plurality of bottom sheets may be placed initially on the conveyor of the bottom sheet build zone conveyor 21 prior to placing any bundles thereon or a sheet or a plurality of sheets may be placed on top of a stack of bundles during the building of a stack with additional bundles stacked on the sheet thereafter. The PLC 26 communicates with the robot controller 15 so that the sheet arm 24 and the robot 14 do not physically interfere with each other during the stacking process.

With continued reference to FIGS. 2 and 3, the hopper 20 includes a plurality of horizontal supports 44a, 44b, and 44c for supporting stacks of sheets 40a, 40b, 40c. Each of the horizontal supports or shelves 44a-44c is connected to vertical support members 38. Each of the horizontal supports 44a-44c includes an associated cantilevered arm 30 that is configured to move vertically along guide rails 31 under actuation from the air cylinders 35. In operation, the cantilevered arm 30 lowers the cross member 32 over a corresponding one of the shelves 44a-44c so that the suction devices 33 may grab and retain a sheet. The cross member 32 lifts an end of the sheet so that the sheet arm 24 may grab and move the sheet to a selected location on or over the build zone. As best shown in FIG. 3, each of the horizontal supports 44a-44c may be accessible from the front even though with the presence of backing plates 36a-36c, while the rear of the hopper 20 may not include a rear wall and is open to facilitate placing additional sheets on the horizontal supports. The hopper 20 also includes a side door 42 connected to the vertical support member 38 to allow the operator 1 access from the side.

Figure 4:
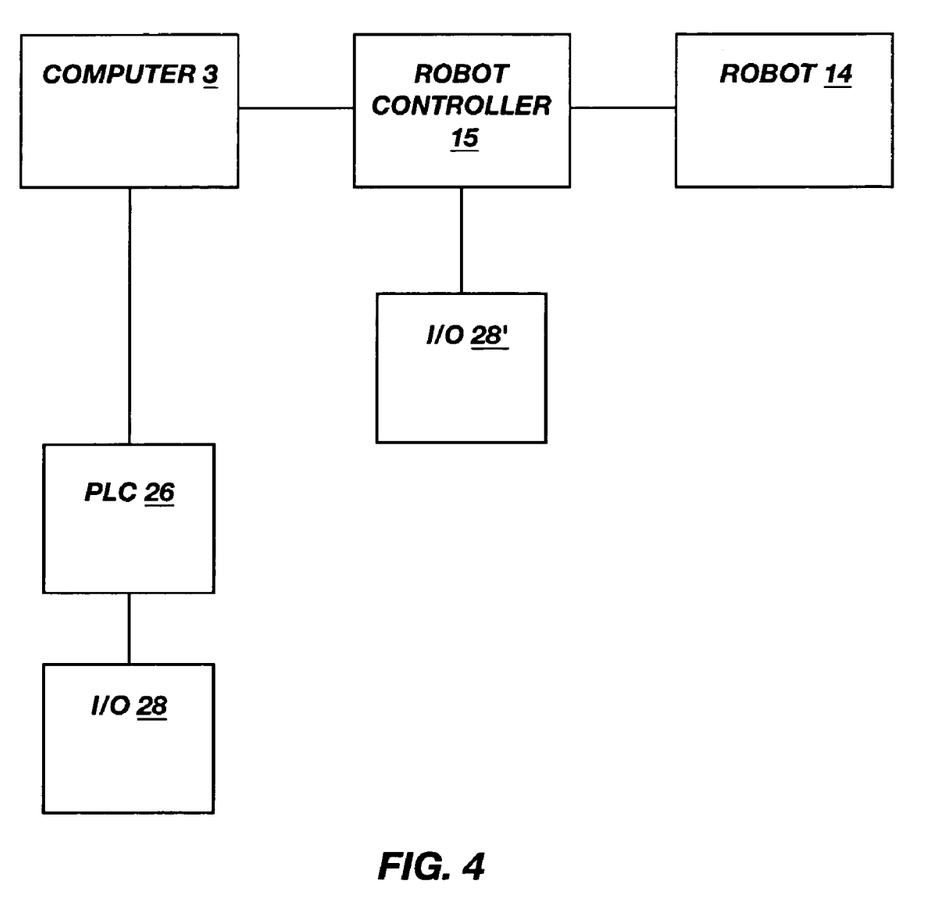
FIG. 4 is a simplified block diagram of a control system that may be used for controlling the programmable load forming system of FIG. 1 according to one embodiment of the invention.

One embodiment for a control system for the programmable load forming system 2 will be better understood with reference to the simplified block diagram of FIG. 4. In FIG. 4, the computer 3 is in operative communication with the robot controller 15 via an Ethernet connection or another suitable connection to transmit instructions to the robot controller 15 to effect operation of the robot 14. The robot controller 15 is, in turn, in operative communication with the robot 14, which causes the robot 14 to operate according instructions therefrom. As shown in FIG. 4, input/outputs (I/O) 28 and 28' of the programmable load forming system 2 (e.g., bundle conditioner 16, conveyor 18, build zone conveyor 19, and sheet arm 24) may be in operative communication with the PLC 26 or directly with the robot controller 15.

The computer 3 may be programmed to cause the robot 14 to move a bundle or bundles in order to create a predetermined stacking pattern. However, it is also contemplated that the robot controller 15 may have memory resident therein that includes the program instructions. However, such embodiment does not facilitate easily altering the operating instructions for the robot 14. Thus, the operator 1 may create a multitude of different stacking patterns to accommodate stacking bundles having variations in height, compressibility, and levelness. The only restriction is that the stack must fit within the confines of the programmable load forming system 2. In one embodiment, the operator 1 may generate a stacking pattern with a visual CAD interface on the monitor 6 of the computer 3. The stacking pattern generated using the visual CAD interface may be scaled and in two or three dimensions.

Figure 5:
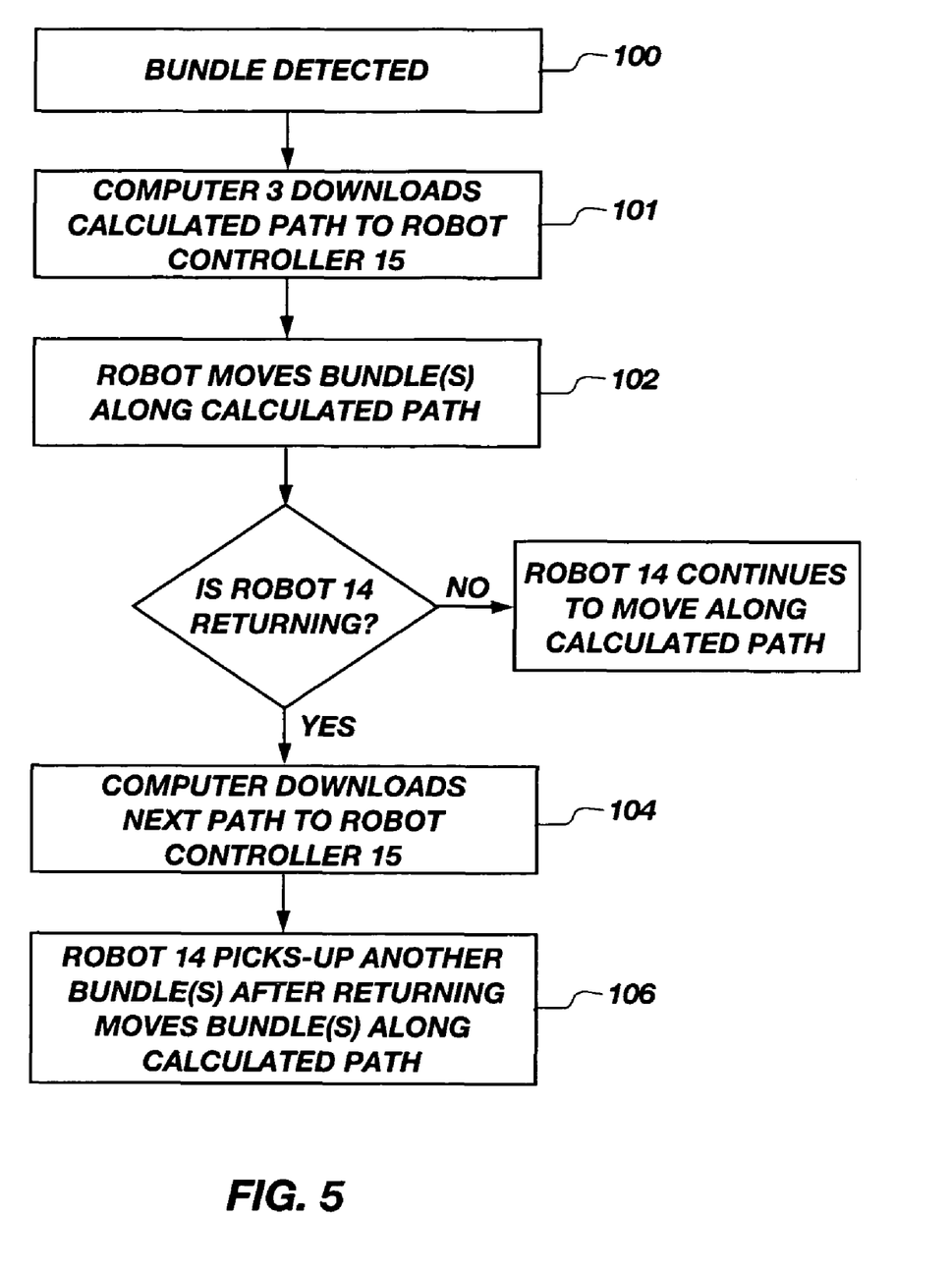
FIG. 5 is a flow diagram describing the operation of the programmable load forming system of FIG. 1 according to one embodiment of a method of the invention.

FIG. 5 is a flow diagram illustrating a method according to one embodiment of the invention. The flow diagram depicts the manner in which the robot 14 may be configured to operate in conjunction with the computer 3. In act 100, the programmable load forming system 2 detects that a bundle or bundles are in position on the conveyor 18. The detection of the bundle or bundles may be effected by an optical detector or an encoder that communicates to the robot controller 15 via the PLC 26 that the bundle or bundles are in position. If a bundle(s) is detected, in act 101, the computer 3 downloads a calculated path to the robot controller 15. The path is defined by a series of points that are calculated by the computer 3 in response to the bundle dimensions and geometry, and stacking pattern. Different stacking patterns and/or bundle geometries will, in-turn, have different points calculated for the path. In act 102, the robot 14 picks-up the bundle(s) with the gripping mechanism 17 thereof and moves the bundle(s) to a selected location on the build zone conveyor 19 along the calculated path that was downloaded from the computer 3 to the robot controller 15. The computer 3 may continuously poll the robot controller 15, and if the computer 3 determines that the robot 14 has completed the path and is returning after moving the bundle(s) to the selected location on the build zone conveyor 19, in act 104, the computer 3 downloads to the robot controller 15 the next calculated path. The next calculated path is downloaded to the robot controller 15 while the robot 14 is returning to pick-up another bundle(s). By downloading the path data to the robot controller 15 during the return of the robot 14, the overall throughput of the programmable load forming system 2 is increased compared to if the path data was downloaded to the robot controller 15 after the robot 14 returned. In act 106, the robot 14 picks-up another bundle(s) and moves the bundle(s) along the calculated path. If the robot 14 is not returning (i.e., the robot 14 is still moving the bundle(s) along the path), the robot 14 continues to move along the calculated path until the path is completed. This process is repeated until the stacking pattern is completed.

Additional embodiments are directed to systems and methods for sensing the top of a bundle prior to the robot 14 placing the bundle(s) on another bundle(s) and removing forks 18 of the gripping mechanism 17 that support the bundle(s) thereunder in a controlled manner that does not substantially disturb an underlying bundle(s). If a bundle(s) is placed on top of another bundle(s) the weight of the bundle(s) and the gripping mechanism 17 is large enough that the lower bundle(s) is deformed or compressed by the weight thereof. If the forks of the gripping mechanism 17 that support the bundle(s) from below are removed, it may cause the stack of bundles to become out of alignment or fall over. In order to prevent this from occurring, as a bundle(s) is being placed on another bundle(s), the gripping mechanism 17 is configured to move vertically by floating on an air cylinder. As the weight of the bundle(s) and the gripping mechanism 17 is being lowered by the robot 14 onto another bundle(s), the gripping mechanism 17 may move upwardly a predetermined distance, which triggers a stop switch that stops the robot 14 from further lowering the bundle(s). Once the detector is triggered, in one embodiment, the operator 1 may decide to move the gripping mechanism 17 carrying the bundle(s) upwardly followed by retracting the forks 30 of the gripping mechanism 17 from underneath the bundle(s) being carried. In one embodiment, the robot 14 may also be programmed to automatically move the gripping mechanism 17 upwardly a predetermined distance followed by removing the forks 30. By upwardly moving the gripping mechanism 17, either by a distance set by the operator 1 or the program, the load on the lower bundle(s) is less, preventing the stack of bundles from being inadvertently moved upon removing the forks 30 of the gripping mechanism 17. In one embodiment, the robot controller 15 and/or the computer 3 may store the distance that the gripping mechanism 17 was moved upwardly, so that the act of sensing the top of the stack does not have to be performed again or at least until a bundle(s) is being placed on another level of the stack.

Yet another embodiment of the invention is directed to systems and methods for moving the robot 14 along a safe path initiated by the operator 1 holding or moving a joystick 12 of the computer 3. For instance, if a bundle or bundles is dropped by the gripping mechanism 17 of the robot 14 or knocked over by the robot 14, the computer 3 may calculate and download to the robot controller 15 a safe path that it may move the robot 14 from its current position to another position without hitting another object. The path is calculated using the robot 14's current position and calculates a set of points to define a path from the current position to a reference position. When the operator 1 jogs the joystick 12, the moveable arm 13 of the robot 14 moves from its current position to a selected location where it is safe to rotate the gripping mechanism 17 without physical interference with another part of the programmable load forming system 2. Once the gripping mechanism 17 is rotated, the robot 14 moves to the reference position. If the gripping mechanism 17 does not need to be rotated, the moveable arm 13 may be moved directly from its current position to the reference position. Once the operator 1 toggles the joystick 12, the computer 3 calculates and subsequently downloads to the robot controller 15 the calculated path. If the operator 1 releases the joystick 12, the robot 14 pauses until the operator 1 toggles it. Once re-toggled and held by the operator 1, the robot 14 moves along its calculated path. This function may be referred to as a "SmartMove" because the computer 3 calculates and defines the path the moveable arm 13 of the robot 14 will travel instead of the operator 1 manually having to move the moveable 13 to avoid objects. However, it is also contemplated, that the operator 1 may move the robot 14 along a path defined by the operator that is controlled by using the joystick 12. Such a path may also be communicated to the robot 14 using the keyboard 8, the mouse 10, the joystick 12, or a touch screen of the monitor 6.

Although the invention has been described with reference to the disclosed embodiments, persons skilled in the art will recognize that changes may be made in form and detail without departing from the spirit and scope of the invention. Such modifications are well within the skill of those ordinarily skilled in the art. Accordingly, the invention is not limited except as by the appended claims.

What is claimed is:

1. A programmable load forming system, comprising:
    a robot comprising:
        a moveable arm configured to carry at least one bundle; and
        a robot controller that causes the moveable arm to perform a function; and
    a computer operably coupled to the robot controller, the computer operable to communicate instructions to the robot controller, the instructions comprising:
        downloading a calculated path from the computer to the robot controller, the calculated path defined, in part, by a stacking pattern;
        moving at least one bundle along the calculated path to position the at least one bundle in a predetermined stacking position of the stacking pattern using the moveable arm; and
        determining if the moveable arm has completed moving along the calculated path, comprising continuously polling the robot controller to determine if the robot has completed moving along the calculated path, and if the robot has completed moving along the calculated path, downloading at least another calculated path from the computer to the robot controller while the robot returns to pick-up at least one additional bundle, the at least another calculated path defined, in part, by the stacking pattern, and moving the at least one additional bundle along the at least another calculated path to position the at least one additional bundle in at least another predetermined stacking position of the stacking pattern using the robot.

2. The programmable load forming system of claim 1 wherein:
    the moveable arm comprises a gripping mechanism configured to carry the at least one bundle; and
    the act of moving at least one bundle using the robot along the calculated path to position the at least one bundle in a stacking position of the stacking pattern comprises supporting the at least one bundle with a gripping mechanism of the robot.

3. The programmable load forming system of claim 1 wherein:
    the programmable load forming system further comprises a build zone conveyor defining the build zone; and
    the act of moving at least one bundle along the calculated path to position the at least one bundle in a predetermined stacking position of the stacking pattern using the robot comprises placing the at least one bundle at the predetermined stacking position over the build zone conveyor.

4. The programmable load forming system of claim 1, further comprising:
    a conveyor operable to transport the at least one bundle to a location in which the moveable arm can pick-up the at least one bundle; and
    a detector operable to detect the presence of the at least one bundle when the at least one bundle is at the location in which the moveable arm can pick-up the at least one bundle.

5. The programmable load forming system of claim 4 wherein the detector comprises one of an optical detector and an encoder.

6. The programmable load forming system of claim 1 wherein the computer includes a user interface configured for a user to input the stacking pattern.

7. The programmable load forming system of claim 6 wherein the user interface comprises a visual CAD interface.

8. A programmable load forming system, comprising:
    a robot comprising:
        a moveable arm;
        a gripping mechanism operably connected with the moveable arm and moveable relative thereto, the gripping mechanism configured to carry at least one bundle; and
        a robot controller that causes the moveable arm and gripping mechanism to perform a function;
    a computer readable medium containing instructions for causing the robot to:
        lower the at least one bundle onto a stack using the moveable arm and gripping mechanism of the robot;
        responsive to the gripping mechanism moving a first predetermined distance relative the moveable arm upon encountering the stack, stop the at least one bundle from being lowered; and
        move the gripping mechanism having the at least one bundle retained thereon upwardly a second predetermined distance prior to release of the bundle from the gripping mechanism onto the stack.

9. The programmable load forming system of claim 8 wherein the computer readable medium is included in the robot controller.

10. The programmable load forming system of claim 8, further comprising a computer including the computer readable medium, the computer operable to transmit the instructions to the robot controller.

11. The programmable load forming system of claim 8 wherein the act of moving the gripping mechanism having the at least one bundle retained thereon upwardly a second predetermined distance is responsive to instructions from an operator.

12. The programmable load forming system of claim 8 wherein the act of moving the gripping mechanism having the at least one bundle retained thereon upwardly a second predetermined distance occurs automatically upon the gripping mechanism moving the first predetermined distance.

13. The programmable load forming system of claim 8 wherein the instructions further comprise storing the second predetermined distance in a memory of the programmable load forming system.

14. The programmable load forming system of claim 8 wherein the moveable arm further comprises an air cylinder allowing the gripping mechanism to move the first predetermined distance relative to the moveable arm upon encountering the stack.

15. The programmable load forming system of claim 8, further comprising placing at least another bundle onto the stack at a height determined at least, in part, from the second predetermined distance.

16. A programmable load forming system, comprising:
    a robot comprising:
        a moveable arm configured to carry at least one bundle; and a robot controller;
computer readable medium containing instructions to cause the moveable arm to move the at least one bundle along a predetermined path, the computer readable medium further comprising instructions for:
responsive to an operator signal, stopping the moveable arm from moving along the predetermined path and calculating a second path for moving the moveable arm from its stopped location to a reference location, the second path calculated such that the moveable arm is free from physical interference from other parts of the programmable load forming system as it travels along the second path to the reference location; and
automatically moving the moveable arm along the second path to the reference location.

17. The programmable load forming system of claim 16 wherein the computer readable medium is included in the robot controller.

18. The programmable load forming system of claim 16, further comprising a computer including the computer readable medium, the computer operable to transmit the instructions to the robot controller.

19. The programmable load forming system of claim 16, further comprising rotating a gripping mechanism of the moveable arm while the moveable arm is positioned at the reference location.

20. The programmable load forming system of claim 16 wherein operator signal is initiated when a joystick of the programmable load forming system is toggled.

21. The programmable load forming system of claim 16 wherein the act of moving the moveable arm from the first location to the reference location is terminated when a joystick of the programmable load forming system is released.

* * * * *